UNITED STATES PATENT OFFICE.

CARL RUMPFF, OF APRATH, NEAR ELBERFELD, PRUSSIA, GERMANY.

MANUFACTURE OF DYE-STUFF OR COLORING-MATTER.

SPECIFICATION forming part of Letters Patent No. 256,379, dated April 11, 1882.

Application filed January 13, 1882. (No specimens.) Patented in England March 21, 1881, in France March 31, 1881, in Belgium April 15, 1881, and in Germany October 11, 1881.

*To all whom it may concern:*

Be it known that I, CARL RUMPFF, residing at Aprath, near Elberfeld, in the Kingdom of Prussia and Empire of Germany, have invented a new and useful Improvement in the Manufacture of Dye-Stuffs or Coloring-Matters, of which the following is a specification.

My invention relates to a new yellow dye-stuff which results from the reaction of nitro-alpha-monosulphonic acid with carbonate of potash.

The preparation and properties of my alpha-monosulphonic acid of beta-naphthol is described in my application for patent filed April 8, 1881.

I dissolve ten kilograms of crystallized alpha-monosulphonic acid of beta-naphthol in twenty kilograms of water, and by boiling evaporate the spirit which was present in the crystals of the acid. I then add fifteen kilograms of nitric acid of about fifty per cent. strength at a temperature of 40° to 50° centigrade. After standing for several days at a temperature of 30° to 40° centigrade the nitration is finished, whereupon I neutralize the liquid with carbonate of potash, and my new dye-stuff is precipitated in the form of a crystalline yellow powder, which is to be purified by solution and recrystallizing.

The proportion of the ingredients, as also the temperatures named in the foregoing description, is susceptible of considerable variations without materially affecting the result.

I claim—

As a new product, the yellow dye-stuff which results from the reaction of the nitro-alpha-monosulphonic acid with carbonate of potash or its equivalent, substantially as described.

CARL RUMPFF.

Witnesses:
HERR KEDENBAR,
S. BOCK.